United States Patent
Wyffels

(10) Patent No.: US 10,254,758 B2
(45) Date of Patent: Apr. 9, 2019

(54) OBJECT TRACKING BY UNSUPERVISED LEARNING

(71) Applicant: Ford Global Technologies, LLC, Dearborn, MI (US)

(72) Inventor: Kevin Wyffels, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 48 days.

(21) Appl. No.: 15/408,877

(22) Filed: Jan. 18, 2017

(65) Prior Publication Data

US 2018/0203447 A1    Jul. 19, 2018

(51) Int. Cl.
| | |
|---|---|
| G01S 17/93 | (2006.01) |
| G05D 1/00 | (2006.01) |
| G05D 1/02 | (2006.01) |
| G06N 7/00 | (2006.01) |
| B60W 30/09 | (2012.01) |
| G01S 17/66 | (2006.01) |
| G01S 7/48 | (2006.01) |
| G01S 17/02 | (2006.01) |

(52) U.S. Cl.
CPC .......... *G05D 1/0088* (2013.01); *B60W 30/09* (2013.01); *G01S 7/4808* (2013.01); *G01S 17/026* (2013.01); *G01S 17/66* (2013.01); *G01S 17/936* (2013.01); *G05D 1/0248* (2013.01); *G06N 7/005* (2013.01); *B60W 2420/52* (2013.01); *B60W 2710/09* (2013.01); *B60W 2710/18* (2013.01); *B60W 2710/20* (2013.01)

(58) Field of Classification Search
CPC ...... G01S 7/4808; G01S 17/66; G01S 17/936; G01S 17/933; G01S 17/93; G05D 1/024; G05D 1/10
See application file for complete search history.

(56) References Cited

U.S. PATENT DOCUMENTS

| | | | |
|---|---|---|---|
| 8,112,225 B2 | 2/2012 | Eidehall et al. | |
| 8,217,938 B2 | 7/2012 | Chen et al. | |
| 8,270,732 B2 | 9/2012 | Cobb et al. | |
| 8,655,513 B2* | 2/2014 | Vanek | G01S 17/58 |
| | | | 356/4.01 |

(Continued)

FOREIGN PATENT DOCUMENTS

| | | |
|---|---|---|
| WO | WO 2012129484 A1 | 9/2012 |
| WO | WO 2016170330 A1 | 10/2016 |

OTHER PUBLICATIONS

Koch, "Bayesian Approach to Extended Object and Cluster Tracking using Random Matrices", IEEE Transactions on Aerospace and Electronic Systems, vol. 44 No. 3, Jul. 2008, pp. 1042-1059. (Year: 2008).*

(Continued)

*Primary Examiner* — Todd M Melton
(74) *Attorney, Agent, or Firm* — Frank A. MacKenzie; Bejin Bieneman PLC

(57) ABSTRACT

A computing device in a vehicle can determine an object by determining a first rectangular bound centered on the object based on joint probabilities of first 3D data points, then determining the object by determining a second rectangular bound centered on the object based on joint Bayesian probabilities of second 3D data points conditioned on the first rectangular bound and piloting the vehicle based on the determined object.

20 Claims, 8 Drawing Sheets

(56) References Cited

U.S. PATENT DOCUMENTS

| | | | |
|---|---|---|---|
| 8,670,604 | B2 | 3/2014 | Eggert et al. |
| 8,736,463 | B1* | 5/2014 | Zhu .................. B60K 31/0008 |
| | | | 340/933 |
| 8,818,702 | B2 | 8/2014 | Zeng et al. |
| 8,923,606 | B2 | 12/2014 | Wu et al. |
| 8,953,888 | B2 | 2/2015 | Kohli et al. |
| 9,076,219 | B2 | 7/2015 | Cha et al. |
| 9,129,211 | B2 | 9/2015 | Zeng |
| 9,305,244 | B2 | 4/2016 | Mathews et al. |
| 9,905,032 | B2* | 2/2018 | Rogan .................. G06T 11/60 |
| 9,945,950 | B2* | 4/2018 | Newman .............. G01S 17/875 |
| 2009/0312985 | A1 | 12/2009 | Eliazar |
| 2010/0164951 | A1 | 7/2010 | Stewart |
| 2012/0116662 | A1 | 5/2012 | Zeng |
| 2013/0246020 | A1 | 9/2013 | Zeng |
| 2015/0154328 | A1 | 6/2015 | Michalke et al. |
| 2015/0310601 | A1 | 10/2015 | Rodriguez et al. |

OTHER PUBLICATIONS

Wyffels et al., "Precision Tracking via Joint Detailed Shape Estimation of Arbitrary Extended Objects", IEEE Transactions on Robotics, vol. 33 No. 2, Apr. 2017 (original publication Dec. 2016), pp. 313-332. (Year: 2016).*

Petrovskaya et al., "Model Based Vehicle Detection and Tracking for Autonomous Urban Driving", Autonomous Robots (2009) 26: 123-139 (official version online at www.springerlink.com), 17 pages.

Non-Final Office Action dated Mar. 12, 2018 for U.S. Appl. No. 15/408,862 (17 pages).

Notice of Allowance dated Feb. 11, 2019 U.S. Appl. No. 15/408,862, filed Jan. 18, 2017.

* cited by examiner

OBJECT TRACKING BY UNSUPERVISED LEARNING

BACKGROUND

Vehicles can be equipped to operate in both autonomous and occupant piloted mode. Vehicles can be equipped with computing devices, networks, sensors and controllers to pilot the vehicle and to assist an occupant in piloting the vehicle. A computing device can monitor the real-world environment of the vehicle via sensors to assist the computing device in piloting the vehicle.

DETAILED DESCRIPTION

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Vehicles can be equipped with computing devices, networks, sensors and controllers to pilot the vehicle and to determine maps of the surrounding real world including features such as roads. Vehicles can be piloted and maps can be determined based on locating and identifying road signs in the surrounding real world. By piloting we mean directing the movements of a vehicle so as to move the vehicle along a roadway or other portion of a path.

Figure 1:
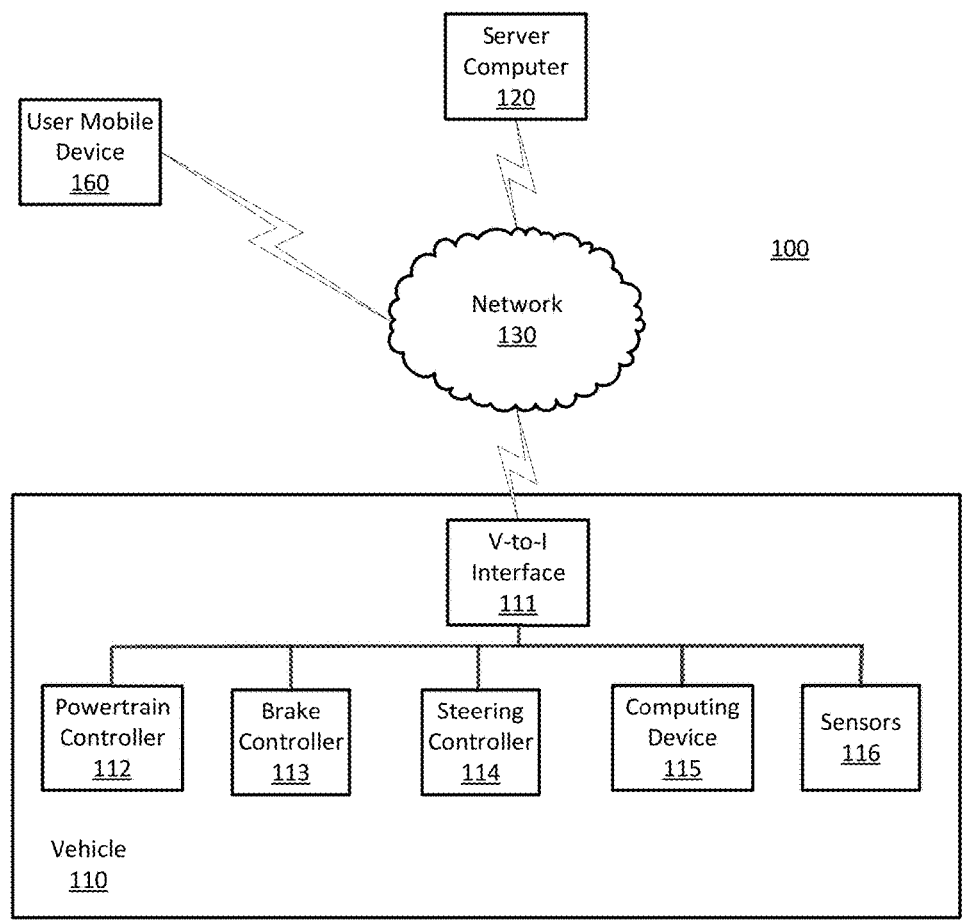
FIG. 1 is a block diagram of an example vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
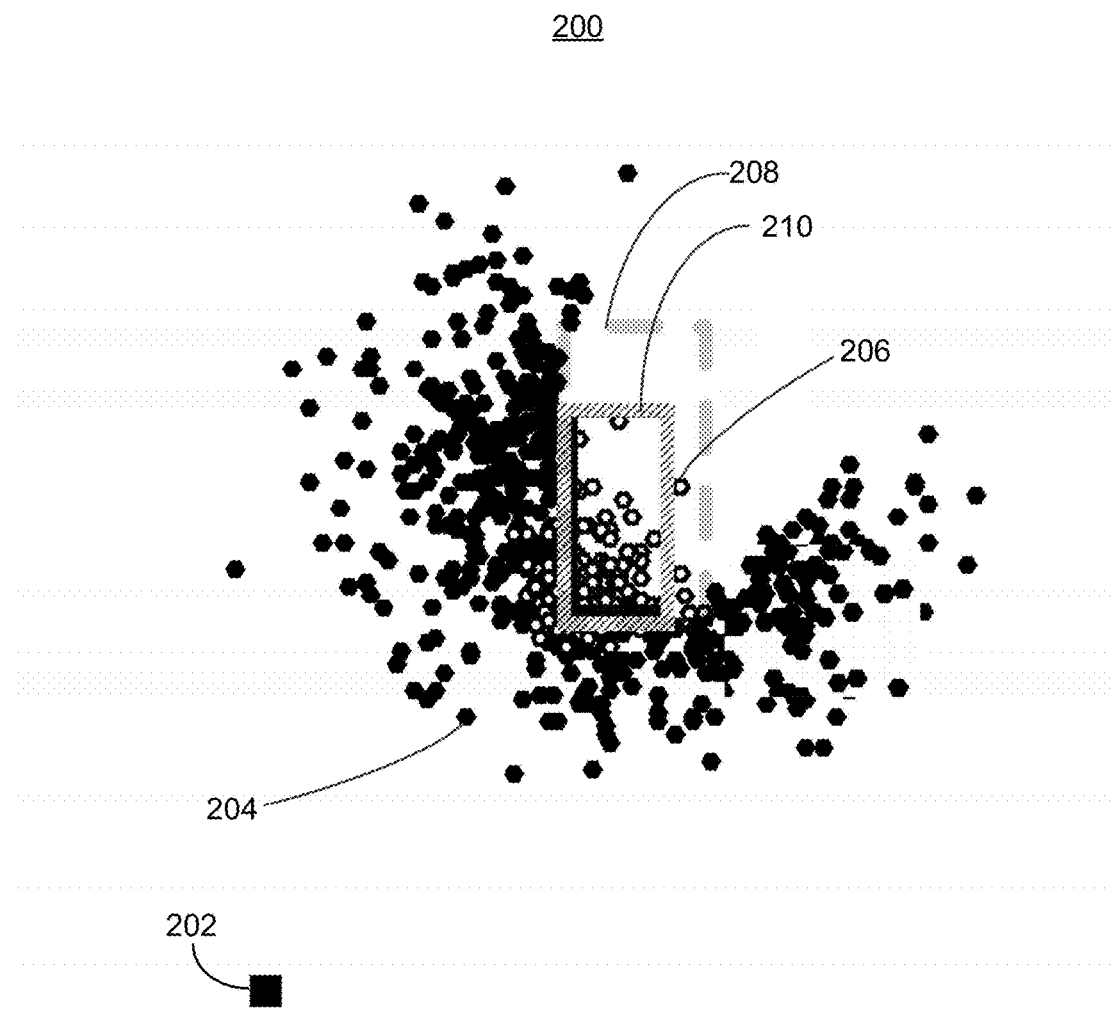
FIG. 2 is a diagram of a LIDAR sensor and 3D data points.

FIG. 2 is a diagram of a traffic scene 200, where a computing device 115 in a vehicle 110 having a LIDAR sensor 202, directs the LIDAR sensor 202 to acquire 3D data points 204, 206. 3D data points 204, 206 are classified into two groups; background 3D data points 204 (closed circles) and object 3D data points 206 (open circles). 3D data points 204, 206 can be automatically labeled as background 3D data points 204 or object 3D data points 206 using well-known machine vision techniques. For example, a prior map of 3D data points can be acquired that represents the static or motionless background. Any 3D data points 204, 206 acquired after that time that match the static background can be labeled as "background" 3D data points 204 and any 3D data points that do not match the static background are labeled "object" 3D data points 206.

Figure 8:
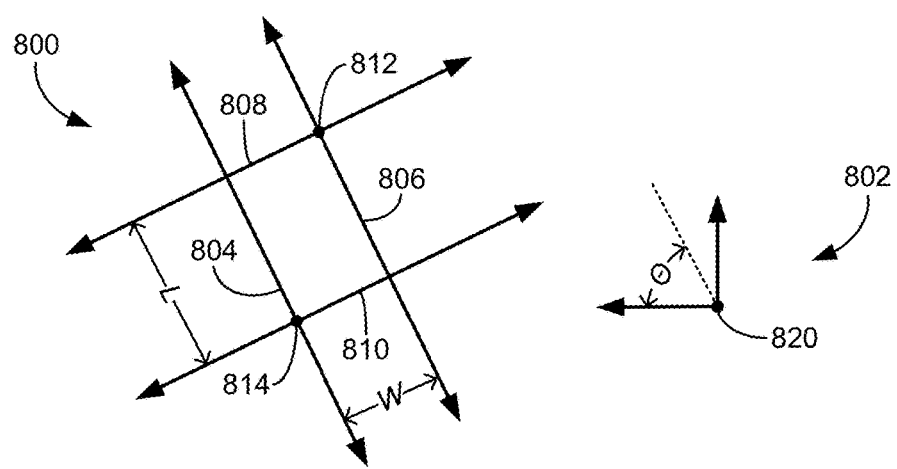
FIG. 8 is a diagram of an enclosing rectangle.

In traffic scene 200, computing device 115 has determined a first estimated enclosing rectangle 208 (grey dashed line) based on the object 3D data points 206. An enclosing rectangle 800 can be defined as shown in FIG. 8. FIG. 8 is a diagram of an enclosing rectangle 800, defined with respect to XY coordinate axes 802 as the intersection of two sets of parallel lines 804, 806, 808, 810. The XY coordinate axes 802 can be defined in a plane parallel to the drivable surface of a roadway, for example. The XY coordinate axes 802 can be defined to point in alignment with geographic directions, with one of the axes pointing north, for example. In another case, the XY coordinate axes 802 can be defined to point in alignment with the pose of vehicle 110, with one of the axes pointing in the direction of travel of vehicle 110, for example. In either case, enclosing rectangle 800 can be defined by location, size and pose of the orthogonal pairs of parallel lines 804, 806, 808, 810.

The location of enclosing rectangle 800 can be defined as the XY coordinates $(x_1, y_1)$ of a vertex point 814, for example, defined in relation to the XY coordinates $(x_0, y_0)$ of origin point 820 of XY coordinate axes 802. The origin point 820 can be associated with a predetermined location on vehicle 110, such as a centroid, for example, and therefore the origin point 820 will translate in the XY plane as the vehicle 110 moves on the roadway. The size and pose of enclosing rectangle 800 can be determined based on the XY coordinates $(x_1, y_1)$, $(x_2, y_2)$ of vertex points 812, 814, for example, where the size in length (L in FIG. 8) and width (W in FIG. 8) can be determined as:

$$W = x_2 - x_1 \quad (1)$$

$$L = y_2 - y_1 \quad (2)$$

and pose, defined as an angle (Θ in FIG. 8) with respect to XY coordinate axes 802 is defined as:

$$\Theta = \tan^{-1}\frac{W}{L} \quad (3)$$

Returning to FIG. 2, computing device 115 has estimated enclosing rectangle 208 (grey dashed lines) based on object 3D data points 206 acquired by LIDAR sensor 202 of true, but unknown to computing device 115, object enclosing rectangle 210 (left diagonal hatch line) by using a rule-based approach that determines parameters for a first enclosing rectangle 208 by first selecting a starting pose for the first enclosing rectangle 208. The starting pose can have the sides of the first enclosing rectangle 208 parallel to the XY coordinate axes 802 respectively, for example. Computing device 115 then iteratively adjusts the orthogonal pairs of parallel lines to the minimum size required to enclose the maximum number of object 3D data points 206 while enclosing no background 3D data points 204, for example.

The starting pose can be initialized with a heuristic box size from a first LIDAR scan, or the starting pose can be initialized by determining bounding boxes as described in the section below entitled "Bounding Box Estimation", assigning a "diffuse" or uniform distribution of model parameters for the prior enclosing rectangle. In this fashion the bounding box estimation algorithm can be informed that we do not have any information about the bounding boxes, but permits the bounding box estimation algorithm to find the best conditioned fit from 3D data points acquired by the first LIDAR scan.

Prior information known by computing device 115 about a bounding box size at the time the 3D data points are acquired by a first LIDAR scan can be used to condition the bounding box estimate. For example, it is known that objects in traffic lanes rarely exceed the lane width and can be aligned with the lane. Information regarding an initial prior distribution of model parameters can be encoded into the first bounding box estimation algorithm iteration.

Figure 3:
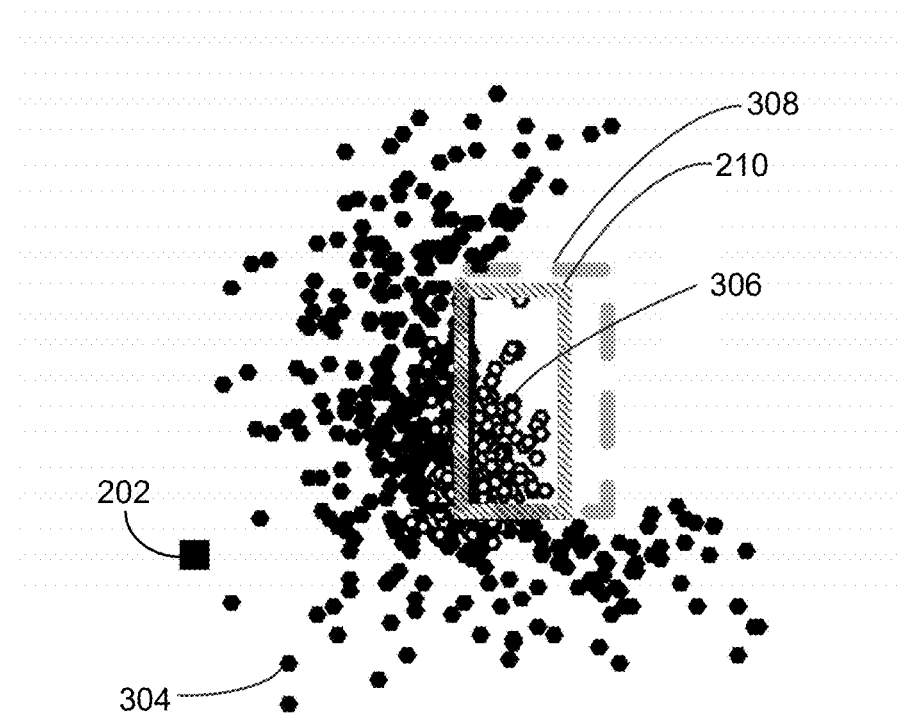
FIG. 3 is a diagram of a LIDAR sensor and 3D data points.

FIG. 3 is a diagram of traffic scene 300, occurring at a new time step, wherein vehicle 110 has moved, including LIDAR sensor 202. LIDAR sensor 202 has provided computing device 115 with a new sample of background 3D data points 304 (closed hexagons) and object 3D data points 306 (open hexagons). Computing device 115 has formed a second estimated enclosing rectangle 308 (dashed lines) of true, but unknown, object enclosing rectangle 210 (left diagonal hatch line) by joint Bayesian inference based on object 3D data points 306 and first estimated enclosing rectangle 208 as discussed in the section below, entitled "Bounding Box Estimation", at the new time step.

The section below, entitled "Bounding Box Estimation", is a derivation of the calculations required to perform bounding box estimation using Bayesian inference by conditioning the probability distributions p on current and prior observations represented by vector of random variables $\underline{Z}_{1:k}$ representing parameters associated with enclosing boxes by the equation:

$$p(\underline{B}, \underline{C}_k, \Theta_k \mid \underline{Z}_{1:k}) = \frac{p(\underline{Z}_k \mid \underline{B}, \underline{C}_k, \Theta_k, \underline{Z}_{1:k-1}) \cdot p(\underline{B} \mid \underline{Z}_{1:k-1}) \cdot \int_{\underline{C}_{k-1}, \Theta_{k-1}} p(\underline{C}_k, \Theta_k, \underline{C}_{k-1}, \Theta_{k-1} \mid \underline{B}, \underline{Z}_{1:k-1})}{p(\underline{Z}_k)} \quad (4)$$

also shown as equation (7) below, where $p(\underline{Z}_k \mid \underline{B}, \underline{C}_k, \Theta_k, \underline{Z}_{1:k-1})$ represents the measurement likelihood at time step k, $p(\underline{B} \mid \underline{Z}_{1:k-1})$ represents the prior time step's box size and $\int_{\underline{C}_{k-1}, \Theta_{k-1}} p(\underline{C}_k, \Theta_k, \underline{C}_{k-1}, \Theta_{k-1} \mid \underline{B}, \underline{Z}_{1:k-1})$ represents a stochastic process model that models the joint Bayesian probability of 3D data point B (location) and enclosing box parameters $\underline{C}_k$, $\Theta_k$ (size and pose) at time step k and k−1, conditioned on the box parameters associated with enclosing boxes from previous time steps. These factors are normalized by dividing by $p(\underline{Z}_k)$, the marginal probability of the enclosing box data at time step k. Appendix A shows the solution of $p(\underline{Z}_k \mid \underline{B}, \underline{C}_k, \Theta_k, \underline{Z}_{1:k-1})$, the measurement likelihoods, in the form of joint Bayesian probability distributions, by calculation of gradients of log-likelihoods and thereby maximizing the measurement likelihoods.

Maximizing the joint Bayesian probability distributions determines the second estimated enclosing rectangle 308 based on the object 3D data points 306 and the first estimated enclosing rectangle 208. Note that as 3D data points 304, 306 from traffic scene 300 are combined with first estimated enclosing rectangle 208, second estimated enclosing rectangle 308 represents an improved estimate of true, but unknown to computing device 115, object enclosing rectangle 210. Note also that, in this case, the pose of second estimated enclosing rectangle 308 did not change from the pose of first estimated enclosing rectangle 208. This does not have to be the case if the pose of the first estimated enclosing rectangle 208 did not happen to match the pose of the true, but unknown, enclosing rectangle 210. In this case the pose of the second estimated enclosing rectangle 308 will be closer to the pose of the true, but unknown, enclosing rectangle 210, than the pose of first estimated enclosing rectangle 208.

Figure 4:
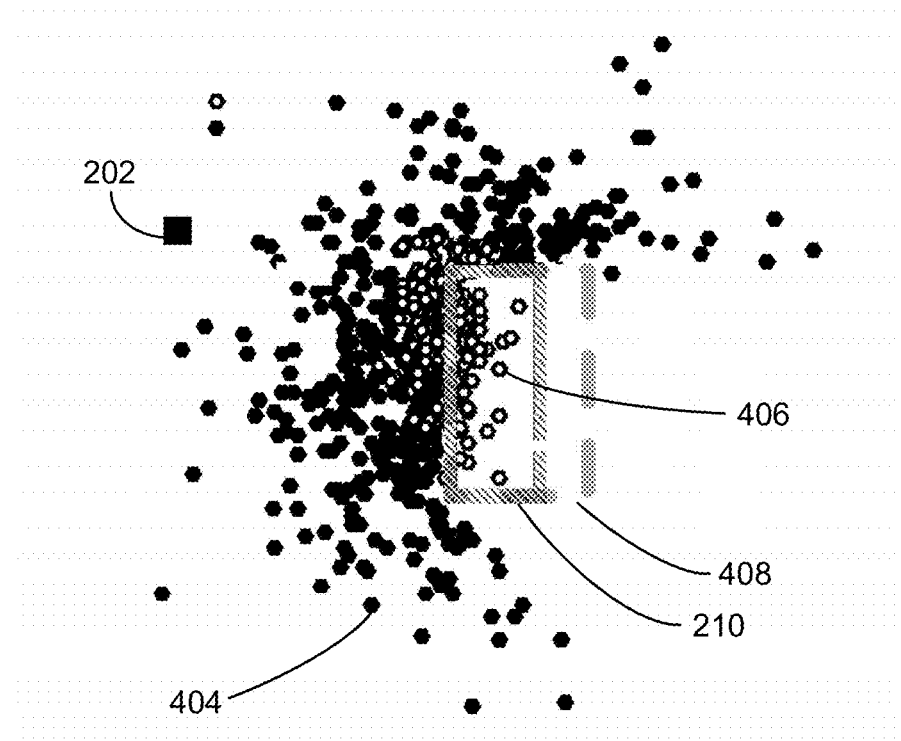
FIG. 4 is a diagram of a LIDAR sensor and 3D data points.

FIG. 4 is a diagram of traffic scene 400, occurring at another new time step, wherein vehicle 110 has again moved, including LIDAR sensor 202. LIDAR sensor 202 has provided computing device 115 with a new sample of background 3D data points 404 (closed circles) and object 3D data points 406 (open circles). Computing device 115 has formed a third estimated enclosing rectangle 408 (dashed lines) of true, but unknown, object enclosing rectangle 210 (left diagonal hatch line) based on object 3D data points 406 and second estimated enclosing rectangle 308 by maximizing joint Bayesian probability distributions as discussed above in relation to FIG. 3 and the section marked "Bounding Box Estimation", at the new time step.

Note again, that as 3D data points 404, 406 from traffic scene 400 are combined with previously estimated enclosing rectangle 308, estimated enclosing rectangle 408 represents an improved estimation of true, but unknown, object enclosing rectangle 210. If the pose of the second estimated enclosing rectangle 308 did not happen to match the pose of the true, but unknown, object enclosing rectangle 210, for example, the pose of the third estimated enclosing rectangle 408 can be closer to the pose of the true, but unknown, object enclosing rectangle 210 than the pose of second estimated enclosing rectangle 308.

Figure 5:
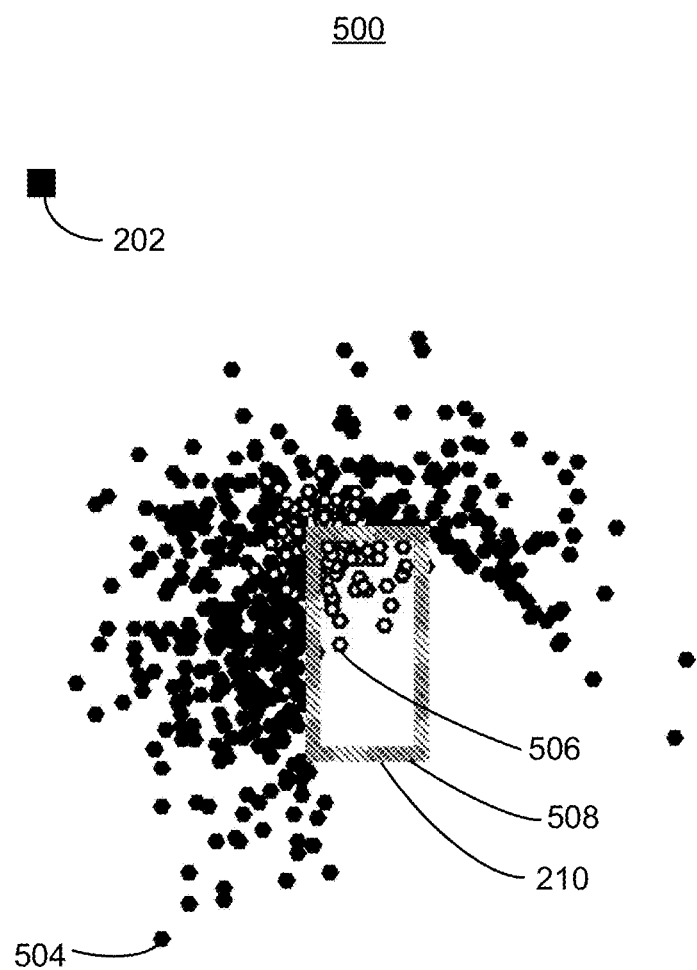
FIG. 5 is a diagram of a LIDAR sensor and 3D data points.

FIG. 5 is a diagram of traffic scene 500, occurring at another new time step, wherein vehicle 110 has again moved, including LIDAR sensor 202. LIDAR sensor 202 has provided computing device 115 with a new sample of background 3D data points 504 (closed circles) and object 3D data points 506 (open circles). Computing device 115 has formed a fourth estimated enclosing rectangle 508 (grey dashed lines) of true, but unknown, object enclosing rectangle 210 (left diagonal hatch line) based on object 3D data points 406 and third estimated enclosing rectangle 406 by maximizing joint Bayesian probability distributions as discussed above in relation to FIG. 3 and the section marked "Bounding Box Estimation", at the new time step.

Note again, that as 3D data points 504, 506 from traffic scene 500 are combined with previously estimated enclosing rectangle 408, fourth estimated enclosing rectangle 508 again represents an improved estimation of true, but unknown, object enclosing rectangle 210. If the pose of the third estimated enclosing rectangle 408 did not happen to match the pose of the true, but unknown, object enclosing rectangle 210, the pose of the fourth estimated enclosing rectangle 508 can be closer to the pose of the true, but unknown, object enclosing rectangle 210 than the pose of third estimated enclosing rectangle 408.

Figure 6:
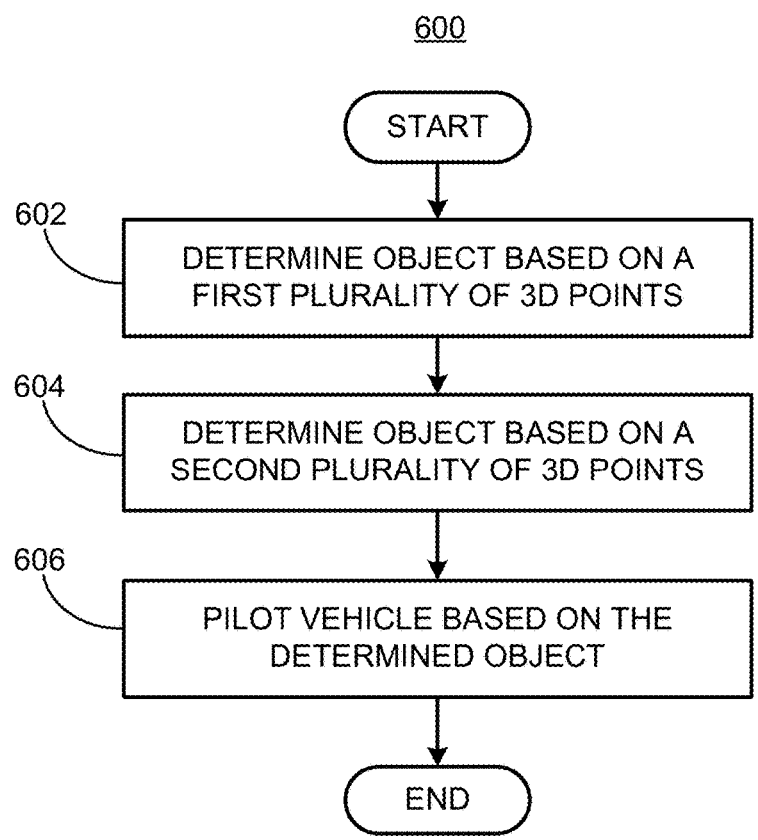
FIG. 6 is a flowchart diagram of an example process to pilot a vehicle.

FIG. 6 is a diagram of a flowchart, described in relation to FIGS. 1-5, of a process 600 for piloting a vehicle 110 based on a determined object, e.g., as described above. Process 600 can be implemented by a processor of computing device 115, taking as input information from sensors 116, and executing instructions and sending control signals via controllers 112, 113, 114, for example. Process 600 includes multiple steps taken in the disclosed order. Process 600 also includes implementations including fewer steps or can include the steps taken in different orders.

Process 600 begins at step 602 where computing device 115 determines a first object based on a first plurality of object 3D data points 206. The first object can be determined by determining parameters of a first estimated enclosing rectangle 208, using a rule-based approach that determines parameters for a first enclosing rectangle 208 by first selecting a starting pose for the first enclosing rectangle 208 and then iteratively adjusting the orthogonal pairs of parallel lines to the minimum size required to enclose the maximum number of object 3D data points 206 while enclosing no background 3D data points 204, as discussed above in relation to FIG. 2. Computing device 115 can also determine a starting pose by predetermining model parameters for the first iteration as discussed above in relation to FIG. 2.

At step 604 computing device 115 determines a second object by determining parameters of a second estimated enclosing rectangle 308 based on maximizing joint Bayesian probability distributions based on the second plurality of object 3D data points 306 and the first estimated enclosing rectangle 208 as discussed above in relation to FIG. 3 and the section marked "Bounding Box Estimation".

At step 606 computing device 115 pilots vehicle 110 based on the second object determined in step 604. Computing device can determine more than one object in the field of view of LIDAR sensor 202 by maximizing joint Bayesian probability distributions using techniques discussed in co-pending application Ser. No. 15/408,862, entitled OBJECT TRACKING BY UNSUPERVISED LEARNING and which has the same inventor and is assigned to the same assignee as this application, which application is fully incorporated herein by reference in its entirety. Computing device 115 can pilot vehicle 110 by predicting paths for objects in the field of view of LIDAR sensor 202 and then planning a path for vehicle 110 to reach a predetermined location while avoiding the objects. The process 600 ends following the block 606.

In summary, process 600 describes a process by which a computing device 115 can acquire first object 3D data points 206 using LIDAR sensor 202, determine a first object based on the first object 3D data points, acquire second object 3D data points 306 using LIDAR sensor 202 and determine a second object in the field of view of LIDAR sensor 202 based on the first object and the second object 3D data points and pilot vehicle 110 to a predetermined location while avoiding the object based on the determined second object.

Figure 7:
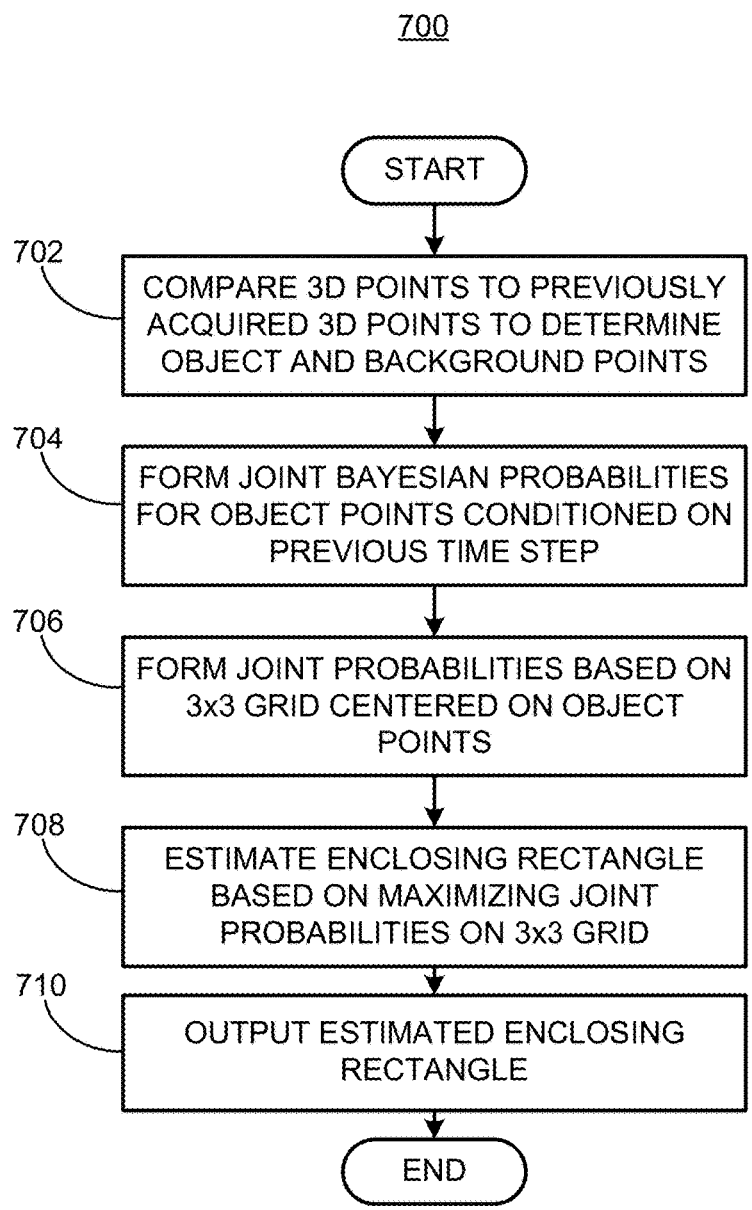
FIG. 7 is a flowchart diagram of an example process to pilot a vehicle.

FIG. 7 is a diagram of a flowchart, described in relation to FIGS. 1-5, of a process 700 for determining an estimated enclosing rectangle based on 3D data points and previously estimated enclosing rectangles, e.g., as described above. Process 700 can be implemented by a processor of computing device 115, taking as input information from sensors 116, and executing instructions and sending control signals via controllers 112, 113, 114, for example. Process 700 includes multiple steps taken in the disclosed order. Process 700 also includes implementations including fewer steps or can include the steps taken in different orders.

Process 700 starts at step 702, where computing device 115 compares acquired 3D data points to previously acquired 3D data points to determine background 3D data points and object 3D data points as discussed above in relation to FIG. 2. At step 704, computing device forms joint Bayesian probability distributions conditioned for each object 3D data point for each object conditioned on the results of a previous time step as discussed above in relation to FIG. 3 and in Appendix A.

At step 706, computing device forms a 3×3 grid, aligned with an enclosing rectangle estimated at a previous time step, as shown in Table 1. of the section marked "Bounding Box Estimation", where the joint Bayesian probability distributions of the object 3D data points are calculated according to class membership probabilities, where object 3D data points within the estimated enclosing rectangle are in class 1 and object 3D data points occurring outside the estimated enclosing rectangle are in classes 2-9.

At step 708 the estimated rectangular bound is determined by maximizing the joint Bayesian probability distributions of the object 3D data points conditioned on a previous estimated rectangular bound according to class membership probabilities on the 3×3 grid as discussed in the section marked "Bounding Box Estimation", and at step 710 computing device 115 can output the estimated rectangular bounds to a process such as process 600 to pilot vehicle 110, for example. The process 700 ends following the block 708.

In summary, process 700 is a process for comparing 3D data points to previously acquired points to determine object 3D data points, forming joint Bayesian probability distributions based on the object 3D data points and conditioned on a previously estimated enclosing rectangle on a 3×3 grid and estimating a new enclosing rectangle based on the object 3D data points and a previously estimated enclosing rectangle and outputting the new estimated enclosing rectangle.

Bounding Box Estimation

Probability distributions p of vectors of random variables $\underline{B}$, $\underline{C}_k$, representing parameters associating 3D data points at time step k with enclosing boxes, and random variable $\Theta_k$ representing parameters associated with the enclosing boxes at a time step k, can be estimated using Bayesian inference to condition the probability distributions p on current and prior observations represented by vector of random variables $\underline{Z}_{1:k}$ representing parameters associated with enclosing boxes by the equations:

$$p(\underline{B}, \underline{C}_k, \Theta_k | \underline{Z}_{1:k}) = \frac{p(\underline{Z}_k | \underline{B}, \underline{C}_k, \Theta_k, \underline{Z}_{1:k-1}) \cdot p(\underline{B}, \underline{C}_k, \Theta_k, | \underline{Z}_{1:k-1})}{p(\underline{Z}_k)} \quad (5)$$

$$= \frac{p(\underline{Z}_k | \underline{B}, \underline{C}_k, \Theta_k, \underline{Z}_{1:k-1}) \cdot p(\underline{B}, | \underline{Z}_{1:k-1}) \cdot p(\underline{C}_k, \Theta_k | \underline{B}, \underline{Z}_{1:k-1})}{p(\underline{Z}_k)} \quad (6)$$

$$= \frac{p(\underline{Z}_k | \underline{B}, \underline{C}_k, \Theta_k, \underline{Z}_{1:k-1}) \cdot p(\underline{B}, | \underline{Z}_{1:k-1}) \cdot \int_{\underline{C}_{k-1}, \Theta_{k-1}} p(\underline{C}_k, \Theta_k, \underline{C}_{k-1}\Theta_{k-1} | \underline{B}, \underline{Z}_{1:k-1})}{p(\underline{Z}_k)} \quad (7)$$

where $p(\underline{Z}_k | \underline{B}, \underline{C}_k, \Theta_k, \underline{Z}_{1:k-1})$ represents the measurement likelihood at time step k, $p(\underline{B} | \underline{Z}_{1:k-1})$ represents the prior time steps box size and $\int_{\underline{C}_{k-1}, \Theta_{k-1}} p(\underline{C}_k, \Theta_k, \underline{C}_{k-1}, \Theta_{k-1} | \underline{B}, \underline{Z}_{1:k-1})$ represents a stochastic process model that models the joint Bayesian probability of 3D data point B and enclosing box parameters $\underline{C}_k$, $\Theta_k$ at time step k and k−1, conditioned on the box size and parameters associated with enclosing boxes from previous time steps. These factors are normalized by dividing by $p(\underline{Z}_k)$, the marginal probability of the enclosing box data at time step k.

Focusing on the measurement likelihood, we first assume each data point is independent, per the equations:

$$\underline{Z}_k \| \underline{Z}_j \forall l \neq k \quad (8)$$

$$\underline{Z}_{j,k} \| \underline{Z}_{j,k} \forall i \neq j \quad (9)$$

where the symbol ∥ means "is statistically independent from", which means that the model maximum likelihood can be calculated as:

$$p(\underline{Z}_k | \underline{B}, \underline{C}_k, \Theta_k, \underline{Z}_{1:k-1}) = \prod_{l=1}^{n_Z} p(\underline{Z}_{l,k} | \underline{B}, \underline{C}_k, \Theta_k) \quad (10)$$

where the ⇈ operator means "the product of Bayesian probability distributions" in this case over 3D data points l from 1 to $n_Z$, the number of 3D data points. Dropping the time step notation (k) for brevity, look at each 3D data point independently, approaching each 3D data point from a classification perspective, where two sets of parallel lines (bound 1, bound 2 and bound 3, bound 4) arranged orthogonally as a bounding box form a grid shown in Table 1:

TABLE 1

Bounding box classes and bounds

| Class 6 | Class 3 | Class 9 | |
| Class 4 | Class 1 | Class 5 | bound 3 |
| Class 8 | Class 2 | Class 7 | bound 4 |
| | bound 2 | bound 1 | |

In local coordinates, the boundary conditions for Class 1 are:

$$\underline{B}^T = \begin{bmatrix} -\underline{U}_L^T, & \underline{U}_L^T \underline{C} + L/2 \\ \underline{U}_L^T, & (-\underline{U})_L^T \underline{C} + L/2 \\ -\underline{U}_W^T, & \underline{U}_W^T \underline{C} + W/2 \\ \underline{U}_W^T, & -\underline{U}_W^T \underline{C} + W/2 \end{bmatrix} \quad (11)$$

where $$\underline{U}_L^T = [\cos\Theta \; -\sin\Theta] \quad (12)$$

$$\underline{U}_W^T = [\sin\Theta, \; \cos\Theta] \quad (13)$$

and where row 1 of array (A7) $-\underline{U}_L^T$, $\underline{U}_L^T\underline{C}+L/2$=left of bound 1, row 2 of array (A7) $\underline{U}_L^T$, $-\underline{U}_L^T\underline{C}+L/2$=right of bound 2, row 3 of array (A7) $-\underline{U}_W^T$, $\underline{U}_W^T\underline{C}+W/2$=below bound 3 and row 4 of array (A7) $\underline{U}_W^T$, $-\underline{U}_W^T\underline{C}+W/2$=above bound 4. The classes can be defined in terms of these boundaries by the equation:

$$\underline{\Theta}^T = \underline{\Gamma} \cdot \underline{B}^T \quad (14)$$

where $$\underline{\Gamma} = \begin{bmatrix} 1 & 1 & 1 & 1 \\ 1 & 1 & 1 & -1 \\ 1 & 1 & -1 & 1 \\ 1 & -1 & 1 & 1 \\ -1 & 1 & 1 & 1 \\ 1 & -1 & 1 & 1 \\ -1 & 1 & 1 & -1 \\ 1 & -1 & 1 & -1 \\ -1 & 1 & -1 & 1 \end{bmatrix} \quad (15)$$

and $$\underline{\Theta}^T = 2\begin{bmatrix} \underline{O}_{1\times 2} & \frac{(L+W)}{2} \\ -\underline{U}_W^T & \underline{U}_W^T\underline{C} + \frac{L}{2} \\ \underline{U}_W^T & -\underline{U}_W^T\underline{C} + \frac{L}{2} \\ -\underline{U}_L^T & \underline{U}_L^T\underline{C} + \frac{W}{2} \\ \underline{U}_L^T & -\underline{U}_L^T\underline{C} + \frac{W}{2} \\ -(\underline{U}_L - \underline{U}_W)^T & (\underline{U}_L - \underline{U}_W)^T\underline{C} \\ (\underline{U}_L - \underline{U}_W)^T & -(\underline{U}_L - \underline{U}_W)^T\underline{C} \\ -(\underline{U}_L + \underline{U}_W)^T & (\underline{U}_L - \underline{U}_W)^T\underline{C} \\ (\underline{U}_L + \underline{U}_W)^T & -(\underline{U}_L - \underline{U}_W)^T\underline{C} \end{bmatrix} \quad (16)$$

where the rows of the 9×2 matrix represent classes 1-9 from top to bottom, respectively.

"Soft" boundaries can be determined using a logistic/softmax function:

$$p(Z_l \mid Z_l \in \text{Class } n, \underline{B}, \underline{C}_k, \Theta_k) = \frac{\exp(\lambda\underline{\Theta}_n^T\tilde{Z}_l)}{\sum_{i=1}^{9}\exp(\lambda\underline{\Theta}_i^T\tilde{Z}_l)} \quad (17)$$

where:

$$\underline{\Theta}_n^T = \text{the } n^{th} \text{ row of } \underline{\Theta}^T \quad (18)$$

and $$\tilde{Z}_l = \begin{bmatrix} Z_l \\ 1 \end{bmatrix} \quad (19)$$

Now, assume the softmax function accurately labels the object (e.g. class 1) or not (e.g. class 2-9). This motivates forming a "super class" equal to the union of all classes >1.

$$p(Z_l \mid \text{in}, \underline{B}, \underline{C}_k, \Theta_k) = \frac{\exp(\lambda\underline{\Theta}_n^T\tilde{Z}_l)}{\sum_{i=1}^{9}\exp(\lambda\underline{\Theta}_i^T\tilde{Z}_l)} \quad (20)$$

$$p(Z_l \mid \text{out}, \underline{B}, \underline{C}_k, \Theta_k) = \frac{\exp(\lambda\underline{\Theta}_n^T\tilde{Z}_l)}{\sum_{i=1}^{9}\exp(\lambda\underline{\Theta}_i^T\tilde{Z}_l)} \quad (21)$$

Returning to model maximum likelihood calculation and substituting yields:

$$p(\underline{B}, \underline{C}_k, \Theta_k \mid Z_{1:k}) = \frac{p(\underline{B} \mid Z_{1:k-1}) \cdot p(\underline{C}_k, \Theta_k \mid \underline{B}, Z_{1:k-1}) \cdot \prod_{l=1}^{n_{Z_k}} p(Z_{l,k} \mid \underline{B}, \underline{C}_k, \Theta_k)}{p(Z_k)} \quad (22)$$

At this point, two options exist to solve the maximum likelihood calculation:
1. Take an EKF (extended Kaman filter) prediction as p($\underline{C}_k$, $\Theta_k|\underline{B}$, $\underline{Z}_{1:k-1}$). Note that in this case, the marginal posterior probability distributions over $\underline{C}_k$ and $\Theta_k$ cannot be used in the EKF as an observation because it would be incestuous.

2. Assume a uniform/uninformative/diffuse prior marginal posterior probability distributions over $\underline{C}_k$ and $\Theta_k$. Then we can use the marginal posterior probability distributions as an observation in the EKF calculation.

Assuming option 2:

$$p(\underline{B}, \underline{C}_k, \Theta_k | \underline{Z}_{1:k}) \approx p(\underline{B} | \underline{Z}_{1:k-1}) \cdot \prod_{l=1}^{n_Z} p(\underline{Z}_{l,k} | \underline{B}, \underline{C}_k, \Theta_k) \quad (23)$$

Adding clustering (object) labels to the notation:

$$p(\underline{B}, \underline{C}_k, \Theta_k | \underline{Z}_{1:k}, \underline{Y}_k) \approx \quad (24)$$

$$p(\underline{B} | \underline{Z}_{1:k-1}) \cdot \left\{ \prod_{l \in IN} \underbrace{\frac{\exp(\lambda \Theta_n^T \tilde{Z}_l)}{\sum_{i=1}^{9} \exp(\lambda \Theta_i^T \tilde{Z}_l)}}_{\Phi_l^{IN}} \cdot \prod_{l \in OUT} \underbrace{\frac{\exp(\lambda \Theta_n^T \tilde{Z}_l)}{\sum_{i=1}^{9} \exp(\lambda \Theta_i^T \tilde{Z}_l)}}_{\Phi_l^{OUT}} \right\}$$

note that $\Phi_l^{OUT} = 1 - \Phi_l^{IN} = 1 - \Phi_l$. Restating equation 20 using this notation:

$$p(\underline{B}, \underline{C}_k, \Theta_k | \underline{Z}_{1:k}, \underline{Y}_k) \approx p(\underline{B} | \underline{Z}_{1:k-1}) \cdot \{ \prod_{l \in IN} \Phi_l \prod_{l \in OUT} (1 - \Phi_l) \} \quad (25)$$

take the natural log:

$$L = \ln[p(\underline{B} | \underline{Z}_{1:k-1})] + \Sigma_{l \in IN} \ln(\Phi_l) + \Sigma_{l \in OUT} \ln(1 - \Phi_l) \quad (26)$$

Now compute the gradient. First, let:

$$\underline{M} = \begin{bmatrix} \underline{B} \\ \underline{C}_k \\ \Theta_k \end{bmatrix} = \text{set of model parameters} \quad (27)$$

and $$\frac{\partial L}{\partial \underline{M}} = \frac{\partial}{\partial \underline{M}} \ln[p(\underline{B} | \underline{Z}_{1:k-1})] + \Sigma_{l \in IN} \ln(\Phi_l) + \Sigma_{l \in OUT} \ln(1 - \Phi_l) \quad (28)$$

$$= \begin{bmatrix} \frac{\partial}{\partial \underline{B}} \ln[p(\underline{B} | \underline{Z}_{1:k-1})] \\ \underline{0}_{2 \times 1} \\ 0 \end{bmatrix}$$

where $\frac{\partial}{\partial \underline{B}} \ln[p\underline{B} | Z_{1:k-1}]$ depends upon the form of the polar and can be set so that it is likely to be "as big" as it was at the previous time step.

Continuing the derivation:

$$\frac{\partial}{\partial \underline{M}} = \ln(\Phi_l) = \frac{1}{\Phi_l} \cdot \frac{\partial \Phi_l}{\partial \underline{M}} \quad (29)$$

$$\frac{\partial}{\partial \underline{M}} = \ln(1 - \Phi_l) = \frac{-1}{1 - \Phi_l} \cdot \frac{\partial \Phi_l}{\partial \underline{M}} \quad (30)$$

substituting:

$$\frac{\partial L}{\partial \underline{M}} = \frac{\partial}{\partial \underline{M}} \ln[p(\underline{B} | Z_{1:k-1})] + \Sigma_{l \in IN} \frac{1}{\Phi_l} \cdot \frac{\partial \Phi_l}{\partial \underline{M}} + \Sigma_{l \in OUT} \frac{-1}{1 - \Phi_l} \cdot \frac{\partial \Phi_l}{\partial \underline{M}} \quad (31)$$

where:

$$\Phi_l = \frac{\exp(\lambda \Theta_n^T \tilde{Z}_l)}{\sum_{i=1}^{9} \exp(\lambda \Theta_i^T \tilde{Z}_l)} = \frac{f_1}{\sum_{j=1}^{9} f_j} \quad (32)$$

Then, via the quotient rule:

$$\frac{\partial \Phi_l}{\partial \underline{M}} = \frac{\frac{\partial f_1}{\partial \underline{M}} \cdot \sum_{j=1}^{9} f_j - f_1 \sum_{j=1}^{9} \frac{\partial f_j}{\partial \underline{M}}}{\left[\sum_{j=1}^{9} f_j\right]^2} \quad (33)$$

and via the chain rule:

$$\frac{\partial f_j}{\partial \underline{M}} = \frac{\partial f_j}{\partial \Theta_j} \cdot \frac{\partial \Theta_j}{\partial \underline{M}} \quad (34)$$

$$= \frac{\partial \Theta_j^T}{\partial \underline{M}^T} \cdot \frac{\partial f_j}{\partial \Theta_j^T}$$

and $$\frac{\partial f_j}{\partial \Theta_j^T} = \lambda \cdot \exp(\lambda \Theta_n^T \tilde{Z}_l) \cdot \tilde{Z}_l \quad (36)$$

$$= \lambda \cdot f_j \cdot \tilde{Z}_l$$

where $$\frac{\partial f_j}{\partial \underline{M}} \in \mathbb{R}^{5 \times 1}, \frac{\partial f_j}{\partial \Theta_j^T} \in \mathbb{R}^{3 \times 1}, \text{ and } \frac{\partial \Theta_j^T}{\partial \underline{M}^T} \in \mathbb{R}^{5 \times 1}.$$

Substituting 33 into 31 and substituting the result into 29 and simplifying yields:

$$\frac{\partial \Phi_l}{\partial \underline{M}} = \lambda \Phi_l \cdot \left[ \frac{\sum_{j=2}^{9} (\underline{\Theta}'_1 - \underline{\Theta}'_j) f_j}{\sum_{j=1}^{9} f_j} \right] \cdot \tilde{Z}_l \quad (38)$$

and substituting for $f_j$:

$$= \lambda \Phi_l \cdot \left[ \underbrace{\frac{\sum_{j=2}^{9} (\underline{\Theta}'_1 - \underline{\Theta}'_j) \exp(\lambda \Theta_n^T \tilde{Z}_l)}{\sum_{j=1}^{9} \exp(\lambda \Theta_n^T \tilde{Z}_l)}}_{= \underline{\alpha}_l \in \mathbb{R}^{5 \times 3}} \right] \cdot \tilde{Z}_l \quad (39)$$

Substituting back into the gradient of the log-likelihood and canceling $\Phi_l$:

$$\frac{\partial L}{\partial \underline{M}} = \frac{\partial}{\partial \underline{M}}\ln[p(\underline{B}|\underline{Z}_{1:k-1})] + \lambda\left[\sum_{l\in IN}\underline{\alpha}_l\tilde{Z}_l - \sum_{l\in OUT}\frac{\phi_l}{1-\phi_l}\underline{\alpha}_l\tilde{Z}_l\right] \quad (40)$$

where:

$$\underline{\alpha}_l = \frac{\sum_{j=2}^{9} d\underline{\Theta}'_j \cdot \exp(\lambda\underline{\Theta}_n^T\tilde{Z}_l)}{\sum_{j=1}^{9}\exp(\lambda\underline{\Theta}_n^T\tilde{Z}_l)} \quad (41)$$

The $\Theta'$ can be calculated as:

$$\underline{\Theta}'_1 = \begin{bmatrix} 0 & 0 & 1/2 \\ 0 & 0 & 1/2 \\ 0 & 0 & 0 \\ 0 & 0 & 0 \\ 0 & 0 & 0 \end{bmatrix} \quad \underline{\Theta}'_2 = 2\begin{bmatrix} 0 & 0 & 1/2 \\ 0 & 0 & 0 \\ 0 & 0 & 0 \\ 0 & 0 & \underline{U}_W \\ -(\underline{U}'_W)^T & (\underline{U}'_W)^T\underline{C} \end{bmatrix} \quad (42)$$

$$\underline{\Theta}'_3 = 2\begin{bmatrix} 0 & 0 & 1/2 \\ 0 & 0 & 0 \\ 0 & 0 & 0 \\ 0 & 0 & \underline{U}_W \\ -(\underline{U}'_W)^T & -(\underline{U}'_W)^T\underline{C} \end{bmatrix} \quad (43)$$

$$\underline{\Theta}'_4 = 2\begin{bmatrix} 0 & 0 & 0 \\ 0 & 0 & 1/2 \\ 0 & 0 & 0 \\ 0 & 0 & \underline{U}_L \\ -(\underline{U}'_L)^T & (\underline{U}'_L)^T\underline{C} \\ -\underline{U}_W^T & -(\underline{U}'_W)^T\underline{C} \end{bmatrix} \quad (44)$$

$$\underline{\Theta}'_5 = 2\begin{bmatrix} 0 & 0 & 0 \\ 0 & 0 & \tfrac{1}{2} \\ 0 & 0 & 0 \\ 0 & 0 & -\underline{U}_L \\ -(\underline{U}'_L)^T & -(\underline{U}'_L)^T\underline{C} \end{bmatrix} \quad (45)$$

$$\underline{\Theta}'_6 = 2\begin{bmatrix} 0 & 0 & 0 \\ 0 & 0 & 0 \\ 0 & 0 & (\underline{U}_L - \underline{U}_W) \\ 0 & 0 & 0 \\ -(\underline{U}'_L - \underline{U}'_W)^T & (\underline{U}'_L - \underline{U}'_W)^T\underline{C} \end{bmatrix} \quad (46)$$

$$\underline{\Theta}'_7 = 2\begin{bmatrix} 0 & 0 & 0 \\ 0 & 0 & 0 \\ 0 & 0 & -\underline{U}_L \\ 0 & 0 & 0 \\ (\underline{U}'_L - \underline{U}'_W)^T & -(\underline{U}'_L - \underline{U}'_W)^T\underline{C} \end{bmatrix} \quad (47)$$

$$\underline{\Theta}'_8 = 2\begin{bmatrix} 0 & 0 & 0 \\ 0 & 0 & 0 \\ 0 & 0 & (\underline{U}_L + \underline{U}_W) \\ 0 & 0 & 0 \\ -(\underline{U}'_L + \underline{U}'_W)^T & -(\underline{U}'_L + \underline{U}'_W)^T\underline{C} \\ -(\underline{U}'_L - \underline{U}'_W) & -(\underline{U}'_L - \underline{U}'_W)\underline{C} \end{bmatrix} \quad (47)$$

$$\underline{\Theta}'_9 = 2\begin{bmatrix} 0 & 0 & 0 \\ 0 & 0 & 0 \\ 0 & 0 & -(\underline{U}_L + \underline{U}_W) \\ 0 & 0 & 0 \\ -(\underline{U}'_L + \underline{U}'_W)^T & -(\underline{U}'_L + \underline{U}'_W)^T\underline{C} \end{bmatrix} \quad (48)$$

where:

$$\underline{U}_L^T = [\cos\Theta \quad -\sin\Theta] \quad (49)$$

$$\underline{U}_W^T = [\sin\Theta \quad \cos\Theta] \quad (50)$$

$$(\underline{U}_L^T)' = -[\sin\Theta \quad \cos\Theta] \quad (51)$$

$$(\underline{U}_W^T)' = [\cos\Theta \quad -\sin\Theta] \quad (52)$$

$$(\underline{U}_L^T)' = -\underline{U}_W^T, (\underline{U}_W^T)' = \underline{U}_L^T \quad (53)$$

and the differences $d\underline{\Theta}'_j = \underline{\Theta}'_1 - \underline{\Theta}'_j$; calculated as:

$$d\underline{\Theta}'_2 = 2\begin{bmatrix} 0 & 0 & 0 \\ 0 & 0 & 1/2 \\ 0 & 0 & -\underline{U}_W \\ 0 & 0 & 0 \\ -\underline{U}_L^T & -\underline{U}_L^T\underline{C} \end{bmatrix} \quad d\underline{\Theta}'_3 = 2\begin{bmatrix} 0 & 0 & 0 \\ 0 & 0 & 1/2 \\ 0 & 0 & \underline{U}_W \\ 0 & 0 & 0 \\ -\underline{U}_L^T & -\underline{U}_L^T\underline{C} \end{bmatrix} \quad (54)$$

$$d\underline{\Theta}'_4 = 2\begin{bmatrix} 0 & 0 & 1/2 \\ 0 & 0 & 0 \\ 0 & 0 & -\underline{U}_L \\ 0 & 0 & 0 \\ -\underline{U}_W^T & \underline{U}_W^T\underline{C} \end{bmatrix} \quad d\underline{\Theta}'_5 = 2\begin{bmatrix} 0 & 0 & 1/2 \\ 0 & 0 & 0 \\ 0 & 0 & \underline{U}_L \\ 0 & 0 & 0 \\ \underline{U}_W^T & -\underline{U}_W^T\underline{C} \end{bmatrix} \quad (55)$$

$$d\underline{\Theta}'_6 = 2\begin{bmatrix} 0 & 0 & 1/2 \\ 0 & 0 & 1/2 \\ 0 & 0 & -(\underline{U}_L - \underline{U}_W) \\ 0 & 0 & 0 \\ -(\underline{U}'_L + \underline{U}'_W)^T & (\underline{U}'_L + \underline{U}'_W)^T\underline{C} \end{bmatrix} \quad (56)$$

$$d\underline{\Theta}'_7 = 2\begin{bmatrix} 0 & 0 & 1/2 \\ 0 & 0 & 1/2 \\ 0 & 0 & (\underline{U}_L - \underline{U}_W) \\ 0 & 0 & 0 \\ -(\underline{U}'_L + \underline{U}'_W)^T & (\underline{U}'_L + \underline{U}'_W)^T\underline{C} \end{bmatrix} \quad (57)$$

$$d\underline{\Theta}'_8 = 2\begin{bmatrix} 0 & 0 & 1/2 \\ 0 & 0 & 1/2 \\ 0 & 0 & -(\underline{U}_L + \underline{U}_W) \\ 0 & 0 & 0 \\ (\underline{U}'_L - \underline{U}'_W)^T & -(\underline{U}'_L - \underline{U}'_W)^T\underline{C} \end{bmatrix} \quad (58)$$

$$d\underline{\Theta}'_9 = 2\begin{bmatrix} 0 & 0 & 1/2 \\ 0 & 0 & 1/2 \\ 0 & 0 & (\underline{U}_L + \underline{U}_W) \\ 0 & 0 & 0 \\ -(\underline{U}'_L - \underline{U}'_W)^T & -(\underline{U}'_L - \underline{U}'_W)^T\underline{C} \end{bmatrix} \quad (59)$$

In summary, the log-likelihood function to be maximized is:

$$L = \ln[p(\underline{B}|\underline{Z}_{1:k-1})] + \Sigma_{l\in IN}\ln(\Phi_l) + \Sigma_{l\in OUT}\ln(1-\Phi_l) \quad (60)$$

and its gradient is:

$$\frac{\partial L}{\partial \underline{M}} = \frac{\partial}{\partial \underline{M}} \ln[p(B|Z_{1:k-1})] + \sum_{l \in IN} \ln(\phi_l) + \sum_{l \in OUT} \ln(1-\phi_l) \quad (61)$$

where:

$$\underline{\alpha}_l = \frac{\sum_{j=2}^{9} d\underline{\Theta}'_j \cdot \exp(\lambda \underline{\Theta}_j^T \tilde{Z}_l)}{\sum_{j=1}^{9} \exp(\lambda \underline{\Theta}_j^T \tilde{Z}_l)}, \tilde{Z}_l = \begin{bmatrix} Z_l \\ 1 \end{bmatrix} \quad (62)$$

and:

$$\Phi_l = \frac{\exp(\lambda \underline{\Theta}_n^T \tilde{Z}_l)}{\sum_{i=1}^{9} \exp(\lambda \underline{\Theta}_i^T \tilde{Z}_l)}, d\underline{\Theta}'_j = \begin{matrix} \text{matrices } A49 - A54 \\ \forall j \in [2, \ldots, 9] \end{matrix} \quad (63)$$

Now, $\lambda$ is a tuning parameter directly proportional to the "sharpness" of the softmax function, where:

$\Phi_l$ = measured probability that a point did originate from an object, $1 - \Phi_l$ = measured probability that a point did not originate from object, and $$\frac{\Phi_l}{1-\Phi_l} = \frac{\exp(\lambda \underline{\Theta}_n^T \tilde{Z}_l)}{\sum_{i=2}^{9} \exp(\lambda \underline{\Theta}_i^T \tilde{Z}_l)} = \text{Probability ratio of point in/out of an object.}$$

The gradient can be used to maximize the log-likelihood function by finding the Hessian:

$$\underline{H} = \quad (64)$$

$$\frac{\partial^2 L}{\partial \underline{M}^2} = \frac{\partial^2}{\partial \underline{M}^2} L_B + \lambda \left[ \sum_{l \in IN} \underbrace{\frac{\partial}{\partial \underline{M}} \cdot \underline{J}_l^{IN}}_{\underline{H}_l^{IN}} + \sum_{l \in OUT} \underbrace{\frac{\partial}{\partial \underline{M}} \cdot \frac{\Phi_l}{1-\Phi_l} \cdot \underline{J}_l^{IN}}_{\underline{H}_l^{OUT}} \right]$$

where:

$$\underline{J}_l^{IN} = \underline{\alpha}_l \cdot \tilde{Z}_l, \underline{H}_l^{IN} = \frac{\partial}{\partial \underline{M}} \cdot \underline{J}_l^{IN}, \underline{H}_l^{OUT} = \frac{d}{d\underline{M}} \cdot \frac{\Phi_l}{1-\Phi_l} \cdot \underline{J}_l^{IN} \quad (65)$$

Using the Product Rule to express $\underline{H}_l^{OUT}$ in denominator format:

$$\underline{H}_l^{OUT} = \frac{\Phi_l}{1-\Phi_l} \cdot \underline{H}_l^{IN} + \left[ \frac{d}{d\underline{M}} \cdot \frac{\Phi_l}{1-\Phi_l} \right] (\underline{J}_l^{IN})^T \ldots \quad (66)$$

Now use the Quotient Rule:

$$\frac{d}{d\underline{M}} \cdot \frac{\Phi_l}{1-\Phi_l} = \frac{\left[ \frac{d}{d\underline{M}} \cdot \Phi_l \right](1-\Phi_l) - \Phi_l \cdot \frac{d}{d\underline{M}}(1-\Phi_l)}{(1-\Phi_l)^2} \quad (67)$$

-continued $$= \frac{\frac{d}{d\underline{M}} \cdot \Phi_l}{(1-\Phi_l)^2} = \lambda \frac{\Phi_l}{(1-\Phi_l)^2} \cdot \underbrace{\underline{\alpha}_l \cdot \tilde{Z}_l}_{=\underline{J}_l^{IN}} \quad (68)$$

substitute back into (66):

$$\underline{H}_l^{OUT} = \frac{\Phi_l}{1-\Phi_l} \cdot \underline{H}_l^{IN} + \lambda \cdot \frac{\Phi_l}{(1-\Phi_l)^2} \cdot \underline{J}_l^{IN} \cdot (\underline{J}_l^{IN})^T \quad (69)$$

and $$\underline{H}_l^{IN} = \frac{\partial}{\partial \underline{M}} \underline{J}_l^{IN} = \frac{\partial}{\partial \underline{M}} \underline{\alpha}_l \tilde{Z}_l = \frac{\partial}{\partial \underline{M}} \frac{\sum_{j=2}^{9} \underline{\Theta}'_j f_j}{\sum_{j=1}^{9} f_j} \tilde{Z}_l \quad (70)$$

which, by the quotient rule equals:

$$= \frac{\left[ \sum_{j=2}^{9} \frac{d}{d\underline{M}} \underline{\Theta}'_j f_j \tilde{Z}_l \right] \cdot \sum_{j=1}^{9} f_j - \left[ \sum_{j=1}^{9} \frac{d}{d\underline{M}} f_j \right] \cdot \left[ \sum_{j=2}^{9} \frac{d}{d\underline{M}} \underline{\Theta}'_j f_j \tilde{Z}_l \right]}{\left[ \sum_{j=1}^{9} f_j \right]^2} \quad (71)$$

where:

$$\frac{d}{d\underline{M}} f_j = \lambda f_j \underline{\Theta}'_l \tilde{Z}_l \quad (72)$$

which can be substituted into (71):

$$= \frac{\left[ \sum_{j=2}^{9} \frac{d}{d\underline{M}} \underline{\Theta}'_j f_j \tilde{Z}_l \right]}{\sum_{j=1}^{9} f_j} - \lambda \left( \frac{\sum_{j=1}^{9} \underline{\Theta}'_j f_j}{\sum_{j=1}^{9} f_j} \right) \tilde{Z}_l \tilde{Z}_l^T \underline{\alpha}_l^T \quad (73)$$

and $$= \frac{\left[ \sum_{j=2}^{9} \frac{d}{d\underline{M}} \underline{\Theta}'_j \tilde{Z}_l f_j \right]}{\sum_{j=1}^{9} f_j} - \lambda (\underline{\alpha}_l - \underline{\Theta}'_j) \tilde{Z}_l \tilde{Z}_l^T \underline{\alpha}_l^T \quad (74)$$

where:

$$\frac{d}{d\underline{M}} \underline{\Theta}'_j \tilde{Z}_l f_j = \underbrace{f_j \frac{d}{d\underline{M}} \underline{\Theta}'_j \tilde{Z}_l}_{= \sum_{i=1}^{3} \frac{\partial \underline{\Theta}'_j(:,i)}{d\underline{M}} \tilde{Z}_j = \underline{\Theta}''_j} + \frac{df_j}{d\underline{M}} \tilde{Z}_l^T (\underline{\Theta}'_j)^T \quad (75)$$

which can be substituted back into (74):

$$\frac{\sum_{j=2}^{9}\left[f_j\underline{\underline{\Theta}}''_j + \lambda f_j \underline{\underline{\Theta}}'_j \tilde{Z}_l \tilde{Z}_l^T (\underline{\underline{\Theta}}'_j)^T\right]}{\sum_{j=1}^{9} f_j} + \lambda(\underline{\alpha}_l - \underline{\underline{\Theta}}'_j)\tilde{Z}_l \tilde{Z}_l^T \underline{\alpha}_l^T \quad (76)$$

and substituting back into (70):

$$\underline{\underline{H}}_l^{IN} = \frac{\sum_{j=2}^{9} \underline{\underline{\Theta}}''_j f_j}{\sum_{j=1}^{9} f_j} + \lambda \left\{ \frac{\sum_{j=2}^{9} \underline{\underline{\Theta}}''_j \tilde{Z}_l \tilde{Z}_l^T (\underline{\underline{\Theta}}'_j)^T f_j}{\sum_{j=1}^{9} f_j} + \underbrace{\frac{(\underline{\alpha}_l - \underline{\underline{\Theta}}'_j)\tilde{Z}_l \tilde{Z}_l^T \underline{\underline{\Theta}}'_l}{=\underline{J}_l^{IN}\cdot(\underline{J}_l^{IN})^T - \underline{\underline{\Theta}}'_l \tilde{Z}_l (\underline{J}_l^{IN})^T}}_{=(\underline{J}_l^{IN} - \underline{\underline{\Theta}}'_l \tilde{Z}_l)(\underline{J}_l^{IN})^T} \right\} \quad (77)$$

yields:

$$\underline{\underline{H}}_l^{IN} = \quad (78)$$

$$\frac{\sum_{j=2}^{9}(\underline{\underline{\Theta}}''_1 - \underline{\underline{\Theta}}''_j)}{\sum_{j=1}^{9} f_j} + \lambda \left\{ \frac{\sum_{j=2}^{9} f_j \underline{\underline{\Theta}}''_j \tilde{Z}_l \tilde{Z}_l^T (\underline{\underline{\Theta}}''_1 - \underline{\underline{\Theta}}''_j)^T}{\sum_{j=1}^{9} f_j} (\underline{J}_l^{IN} - \underline{\underline{\Theta}}'_l \tilde{Z}_l)(\underline{J}_l^{IN})^T \right\}$$

which is the desired Hessian form. The $\underline{\underline{\Theta}}''_l$ can be calculated as:

$$\underline{\underline{\Theta}}''_{l,1} = O_{5\times 5} \quad (79)$$

$$\underline{\underline{\Theta}}''_{l,2} = 2 \begin{bmatrix} \underline{O}_{4\times 4} & O_{2\times 1} \\ & \underline{U}_L \\ O_{1\times 2} \underline{U}_L^T & \underline{U}_W^T(Z_l - C) \end{bmatrix} \quad \underline{U}_L = \begin{bmatrix} \cos\Theta \\ -\sin\Theta \end{bmatrix} \quad \underline{U}_W = \begin{bmatrix} \sin\Theta \\ \cos\Theta \end{bmatrix} \quad (80)$$

$$\underline{\underline{\Theta}}''_{l,3} = -\underline{\underline{\Theta}}''_{l,2} \quad (81)$$

$$\underline{\underline{\Theta}}''_{l,4} = 2 \begin{bmatrix} \underline{O}_{4\times 4} & O_{2\times 1} \\ & -\underline{U}_W \\ O_{1\times 2} & -\underline{U}_W & \underline{U}_W^T(Z_l - C) \end{bmatrix} \quad (82)$$

$$\underline{\underline{\Theta}}''_{l,5} = -\underline{\underline{\Theta}}''_{l,4} \quad (83)$$

$$\underline{\underline{\Theta}}''_{l,6} = 2 \begin{bmatrix} \underline{O}_{4\times 4} & O_{2\times 1} \\ & -(\underline{U}_L + \underline{U}_W) \\ O_{1\times 2} - (\underline{U}_L + \underline{U}_W)^T & (\underline{U}_L - \underline{U}_W)^T(Z_l - C) \end{bmatrix} \quad (84)$$

$$\underline{\underline{\Theta}}''_{l,7} = -\underline{\underline{\Theta}}''_{l,6} \quad (85)$$

$$\underline{\underline{\Theta}}''_{l,8} = 2 \begin{bmatrix} \underline{O}_{4\times 4} & O_{2\times 1} \\ & -(\underline{U}_L - \underline{U}_W) \\ O_{1\times 2}(\underline{U}_L - \underline{U}_W)^T & (\underline{U}_L + \underline{U}_W)^T(Z_l - C) \end{bmatrix} \quad (86)$$

$$\underline{\underline{\Theta}}''_{l,7} = -\underline{\underline{\Theta}}''_{l,6} \quad (87)$$

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention

I claim:

1. A method, comprising:
   receiving first and second pluralities of 3D data points at respective first and second times;
   determining a first rectangular bound for an object from the first plurality of 3D data points;
   determining a second rectangular bound centered on the object based on joint probabilities of points in the first rectangular bound and points in the second plurality of 3D data points; and
   piloting a vehicle based on the object.

2. The method of claim 1, wherein the 3D data points are determined by LIDAR.

3. The method of claim 1, wherein determining the object includes determining location, pose and size of the first rectangular bound and the second rectangular bound.

4. The method of claim 1, wherein determining the object includes comparing the first 3D data points to previously acquired 3D data points to determine object data points and background data points.

5. The method of claim 4, wherein the first rectangular bound and the second rectangular bound are determined by maximizing the joint probabilities of the object data points with respect to the background data points.

6. The method of claim 5, wherein maximizing the joint probabilities determines a 3×3 grid centered on the object data points, wherein a center grid of the 3×3 grid includes one or more object points and no background data points.

7. The method of claim 6, wherein the first rectangular bound is defined as the center grid of the 3×3 grid and is used as a starting point for determining the second rectangular bound based on the joint probabilities.

8. The method of claim 7, wherein the joint probabilities are Bayesian probabilities wherein a probability that an object data point belongs to the object is conditioned on a probability that the object data point belonged to the object at a previous time step.

9. The method of claim 8, wherein a maximum likelihood is determined by maximizing natural logarithms of the joint probabilities.

10. The method of claim 9, wherein the joint probabilities are maximized by determining gradients of natural logarithms of each of the joint probabilities.

11. An apparatus, comprising:
    a processor;
    a memory, the memory storing instructions executable by the processor to:
       receive first and second pluralities of 3D data points at respective first and second times;
       determine a first rectangular bound for an object from the first plurality of 3D data points;
       determine a second rectangular bound centered on the object based on joint probabilities of points in the first rectangular bound and points in the second plurality of 3D data points; and
       pilot a vehicle based on the object.

12. The apparatus of claim 11, wherein the 3D data points are determined by LIDAR.

13. The apparatus of claim 11, wherein determining the object includes determining location, pose and size of the first rectangular bound and the second rectangular bound.

14. The apparatus of claim 11, wherein determining the object includes comparing the first 3D data points to previously acquired 3D data points to determine object data points and background data points.

15. The apparatus of claim 14, wherein the first rectangular bound and the second rectangular bound are determined by maximizing the joint probabilities of the object data points with respect to the background data points.

16. The apparatus of claim 15, wherein maximizing the joint probabilities determines a 3×3 grid centered on the object data points, wherein a center grid of the 3×3 grid includes one or more object points and no background data points.

17. The apparatus of claim 16, wherein the first rectangular bound is defined as the center grid of the 3×3 grid and is used as a starting point for determining the second rectangular bound based on the joint probabilities.

18. The apparatus of claim 17, wherein the joint probabilities are Bayesian probabilities wherein a probability that an object data point belongs to the object is conditioned on a probability that the object data point belonged to the object at a previous time step.

19. The apparatus of claim 18, wherein a maximum likelihood is determined by maximizing natural logarithms of the joint probabilities.

20. The apparatus of claim 19, wherein the joint probabilities are maximized by determining gradients of natural logarithms of each of the joint probabilities.

* * * * *